Jan. 24, 1967  J. H. KOERBER  3,299,987

TRAILER BRAKE

Filed Oct. 29, 1964

INVENTOR.
John H. Koerber
BY
Wheeler, Wheeler & Wheeler
ATTORNEYS.

3,299,987
TRAILER BRAKE
John H. Koerber, McHenry, Ill., assignor to Outboard Marine Corporation, Waukegan, Ill., a corporation of Delaware
Filed Oct. 29, 1964, Ser. No. 407,397
4 Claims. (Cl. 188—2)

The invention relates to trailers. More particularly, the invention relates to trailers which have sealed brakes and which are subject to immersion in water, such as boat trailers. The invention is, however, not limited to boat trailers.

In previous trailers including sealed brakes, the seals have often been prematurely ruptured with consequent damage to, or rusting of, various brake components, thereby substantially decreasing the useful life of such brakes. Immersion of the brakes, particularly when relatively warm, in relatively cool water is believed to result in the creation of relatively low pressure conditions within the brake housing, which pressure conditions are believed to contribute to such premature seal ruptures and brake damage.

The invention disclosed herein serves to avoid premature brake damage by affording a vent line which extend from the brake housing to a remote point on the trailer located well beyond the parts of the trailer which are commonly submerged in water. In the preferred construction employing electrical brakes, the vent line is included in a unitary cable which also includes the electrical leads connected to the brake.

Figure 1:
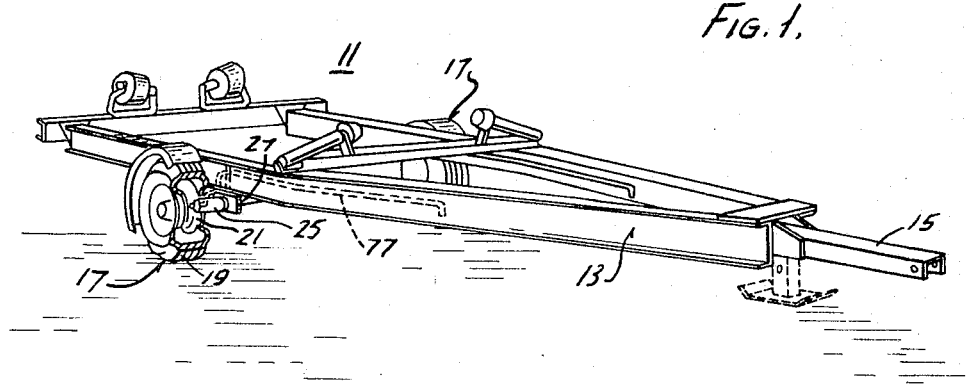
Figure 2:
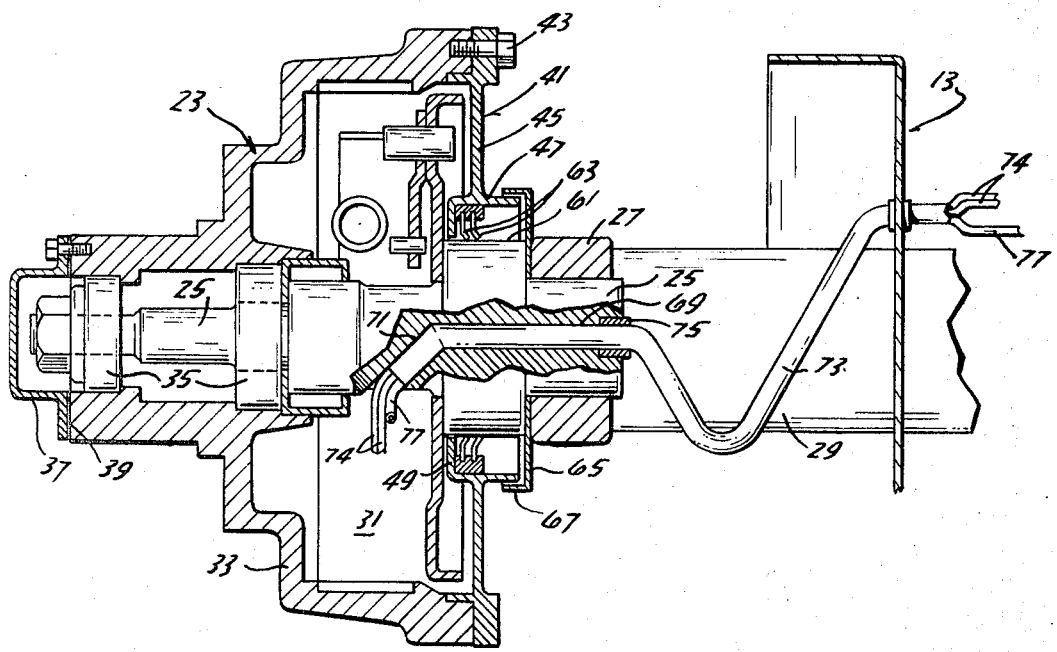

Other objects and advantages of the invention will become known by reference to the following description and the accompanying drawings in which FIGURE 1 is a perspective view, partially broken away and in section, of a boat trailer embodying various of the features of the invention; and FIGURE 2 is an enlarged view, partially broken away and in section, of a part of the trailer shown in FIGURE 1.

The trailer 11 shown in FIGURE 1 includes a frame or bed 13 including a hitch bar 15 and a pair of ground engaging wheels 17. The wheels 17 each include a pneumatic rubber tire 19 mounted on a rim 21, which rim is mounted on the hub of a brake housing 23 which is suitably rotatably carried on a transverse axle 25. In the disclosed construction, the axle 25 is supported on respective cantilever arms 27 resiliently connected to a main supporting axle or member 29 carried by the frame 13. Various other arrangements can be employed to support the axles 25.

Each brake housing 23 is one component of, and encloses, a conventional braking means 31 which may comprise any suitable arrangement for braking rotation of the housing 23 relative to the axle 25. The braking means 31 can be operated either electrically or by fluid. The specifically disclosed brake means is electrically actuated. The constructional details of the particular brake means do not constitute a part of the invention.

Because the wheels 17 and axles 25 are often at least partially submerged during boat loading and unloading operations, the housings 23 are generally sealed against the entry of water and therefore also against the entry of air. More particularly, each housing 23 includes a main part 33 which is supported by bearings 35 on the associated axle 25 and which is closed at one end by a plate 37 and a gasket 39 rotating in common with the main housing part 33.

At its other end, the housing 23 is closed by means including a cover plate 41 which is fixed to the main housing part 33 for rotation therewith by a series of bolts 43 and which includes a radially inwardly extending wall 45. At the inner end of wall 45, the cover plate 41 includes a cylindrical portion 47 having, at one end, a flange 49 which closely approaches one surface 61 of the associated axle 25.

Carried by the cylindrical portion 47 are a series of flexible seals 63 of rubber or like material which bear against the axle surface 61 to prevent entry of water or air notwithstanding rotation of the brake housing 23 relative to the associated axle 25. In order to prevent entry of dirt into the space about the seals 63, there is provided a cover pan 65 which includes a circular flange 67 and which is assembled on the associated axle 25 with the flange 67 in partial telescopic relation to the cylindrical portion 47 of the cover plate before assembly of the axle 25 to the arm 27.

Each of the axles 25 includes an axial bore 69 and a transverse bore 71 which communicates with the axial bore 69 and the interior of the associated brake housing 23. Extending from the interior of the housing 23 through the bores 69 and 71 and to a relatively fixed connection with the frame 13 at a point remote from the associated axle 25 is an integrated or unitary control cable 73 which is connected to the brake means 31 for operation thereof. In the specifically disclosed construction, the cable 73 contains electrical leads 74. At the exterior end of each of the axial bores 69 there is provided a seal or gasket 75 to exclude entry of water or air into the associated brake housing through the bores 69 and 71.

There is also provided, in accordance with the invention, vent means communicating between the interior of the sealed brake housing 23 and as shown, for example, in FIG. 1, directly with the atmosphere at a point remote from the associated axle 25 and located well beyond the normal area of submergence, as shown generally in FIGURE 1. In the disclosed construction, such vent means is in the form of a single flexible tube or line 77 of plastic or other suitable material, which line is integrated with control cable 73 and forms a part thereof. If desired, a vent line separate from the control cable could be used.

In use, the vent line offers relief of any low pressure condition occurring in response to rapid cooling of the brake housing, as by immersion in water. The vent line also affords conduction, through evaporation and passage through the vent line, or any condensation occurring on the inner walls of the housing. In previous completely sealed housings, such condensation was trapped. In addition to the foregoing features, the disclosed arrangement can be provided at a relatively low cost.

Various of the features of the invention are set forth in the following claims.

What is claimed is:

1. A trailer comprising a bed, an axle supported by said bed, brake means including a sealed brake housing rotatably supported on said axle, and a cable connected to said brake means, said cable extending from said sealed housing and including a single vent line communicating with the interior of said brake housing and being directly open to the atmosphere at a point remote from said axle.

2. A vehicle comprising a frame, a sealed brake housing adapted to support a wheel, an axle connected to said frame and extending into said housing, a pair of spaced bearings on said axle in said housing rotatably supporting said sealed housing, said axle having an axial bore therein communicating with the interior of said housing, a single vent line extending in said bore, communicating with the interior of said sealed housing, and being directly open to the atmosphere at a point remote from said axle, and a seal interposed between said vent line and said bore.

3. A trailer comprising a bed, electric brake means including a sealed housing adapted to support a wheel, an axle connected to said bed and extending into said housing, a pair of spaced bearings on said axle in said housing rotatably supporting said sealed housing, said axle having an axial bore therein communicating with the interior of said housing, a unitary control cable including electrical leads connected to said brake means and a single vent line communicating with the interior of said sealed housing, said control cable extending through said bore and said vent line being directly open to the atmosphere at a point remote from said axle, and a seal interposed between said control cable and said bore.

4. A vehicle comprising a frame, electric brake means including a sealed housing adapted to support a wheel, an axle connected to said frame and rotatably supporting said sealed housing, said axle having an axial bore therein communicating with the interior of said housing, and an integrated control cable including electrical leads connected to said brake means and a single vent line communicating with the interior of said sealed housing, said control cable extending from said bore and said vent line being directly open to the atmosphere at a point remote from said axle.

References Cited by the Examiner
UNITED STATES PATENTS

| | | | |
|---|---|---|---|
| 2,095,039 | 10/1937 | Schmidt | 188—161 X |
| 2,136,472 | 11/1938 | Sinclair | 188—264 |
| 2,356,111 | 8/1944 | Weeks et al. | 188—264 |
| 2,550,068 | 4/1951 | Hudson | 188—161 X |
| 3,144,099 | 8/1964 | Cadmus | 188—264 X |

DUANE A. REGER, *Primary Examiner.*